us010997327B2

(12) United States Patent
Fredrich et al.

(10) Patent No.: US 10,997,327 B2
(45) Date of Patent: May 4, 2021

(54) DIRECT NUMERICAL SIMULATION OF PETROPHYSICAL PROPERTIES OF ROCKS WITH TWO OR MORE IMMICIBLE PHASES

(71) Applicant: BP Corporation North America Inc., Houston, TX (US)

(72) Inventors: Joanne Fredrich, Bow, WA (US); Nathan Lane, Katy, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 427 days.

(21) Appl. No.: 15/797,121

(22) Filed: Oct. 30, 2017

(65) Prior Publication Data

US 2018/0121579 A1    May 3, 2018

Related U.S. Application Data

(60) Provisional application No. 62/415,050, filed on Oct. 31, 2016.

(51) Int. Cl.
*G06F 30/20* (2020.01)
*G01V 99/00* (2009.01)
(Continued)

(52) U.S. Cl.
CPC ............ *G06F 30/20* (2020.01); *G01V 99/005* (2013.01); *G06T 7/11* (2017.01); *G06T 7/62* (2017.01); *G06F 2111/10* (2020.01)

(58) Field of Classification Search
CPC ... G06F 17/5009; G06F 2217/16; G06T 7/62; G06T 7/11; G01V 99/005
See application file for complete search history.

(56) References Cited

U.S. PATENT DOCUMENTS 8,081,802 B2    12/2011    Dvorkin et al.
8,583,410 B2    11/2013    Sisk et al.
(Continued)

FOREIGN PATENT DOCUMENTS

WO    2011/149808 A2    12/2011
WO    2011/149808 A3    4/2012
(Continued)

OTHER PUBLICATIONS

Silin, Dmitriy, and Tad Patzek. "Pore space morphology analysis using maximal inscribed spheres." Physica A: Statistical mechanics and its applications 371, No. 2 (2006): 336-360. (Year: 2006).*
(Continued)

*Primary Examiner* — Chuen-Meei Gan
(74) *Attorney, Agent, or Firm* — Conley Rose, P.C.

(57) ABSTRACT

A method for analyzing a rock sample includes segmenting a digital image volume corresponding to the rock sample, to associate voxels in the digital image volume with pore space or solid material. A distance transform is applied to each pore space voxel. The distance transform assigns a distance value to the pore space voxel specifying distance from the pore space voxel to a solid material voxel. Drainage is numerically simulated by, for a pore space, selecting each distance value assigned to a pore space voxel that is greater than a predetermined threshold value to represent a radius of a sphere of a non-wetting fluid introduced into the pore space. The sphere is centered at the pore space voxel corresponding to the distance value. The digital image volume is numerically analyzed to characterize a material property of the rock sample at a non-wetting fluid saturation produced by the drainage.

23 Claims, 10 Drawing Sheets

(51) Int. Cl.
*G06T 7/11* (2017.01)
*G06T 7/62* (2017.01)
*G06F 111/10* (2020.01)

(56) References Cited

U.S. PATENT DOCUMENTS

| | | | |
|---|---|---|---|
| 2010/0049451 | A1 | 2/2010 | Lu et al. |
| 2010/0128933 | A1 | 5/2010 | Derzhi et al. |
| 2011/0181701 | A1* | 7/2011 | Varslot ............... G06T 7/30 348/46 |
| 2014/0019054 | A1* | 1/2014 | De Prisco ............ G01N 15/08 702/12 |
| 2014/0270394 | A1* | 9/2014 | Fredrich ............... G06K 9/64 382/109 |
| 2015/0043787 | A1* | 2/2015 | Fredrich ............ G06F 17/5018 382/109 |
| 2015/0185122 | A1* | 7/2015 | Lakshtanov .......... G01N 1/286 378/4 |
| 2016/0307312 | A1* | 10/2016 | Sungkorn ............ G06T 7/0004 |

FOREIGN PATENT DOCUMENTS

| | | |
|---|---|---|
| WO | 2013/039416 A1 | 3/2013 |
| WO | 2015/021182 A1 | 2/2015 |

OTHER PUBLICATIONS

Chapter 7 of Formation Evaluation. Dr. Paul W.J. Glover http://homepages.see.leeds.ac.uk/~earpwjg/PG_EN/CD%20Contents/Formation%20Evaluation%20English/ (Year: 2014).*

Hilpert, Markus, and Cass T. Miller. "Pore-morphology-based simulation of drainage in totally wetting porous media." Advances in Water Resources 24, No. 3-4 (2001): 243-255. (Year: 2001).*

Ryazanov AV, Van Dijke MI, Sorbie KS. Two-phase pore-network modelling: existence of oil layers during water invasion. Transport in Porous Media. Oct. 1, 2009;80(1):79-99. (Year: 2009).*

Man HN, Jing XD. Pore network modelling of electrical resistivity and capillary pressure characteristics. Transport in Porous Media. Dec. 1, 2000;41 (3):263-85. (Year: 2000).*

Jiang Z, Van Dijke R, Geiger S, Couples G, Wood R. Extraction of fractures from 3D rock images and network modelling of multiphase flow in fracture-pore systems. InInternational Symposium of the Society of Core Analysts, Aberdeen, Scotland Aug. 2012. (Year: 2012).*

International Patent Application No. PCT/US2017/058275 International Search Report and Written Opinion dated Dec. 15, 2017 (14 pages).

Schena, Gianni et al., "Pore space network characterization with sub-voxel definition," Transport in Porous Media, Kluwer Academic Publishers, DO, vol. 7, No. 2, Jan. 31, 2007, pp. 181-190.

Ragnemalm, Ingemar, "Fast erosion and dilation by contour processing and thresholding of distance maps," Pattern Recognition Letters, Elsevier Science Publishers B.V., Amsterdam, NL, vol. 13, No. 3, Mar. 1, 1992, pp. 161-166.

Rabbani, Arash et al., "An automated simple algorithm for realistic pore network extraction from micro-tomography images," Journal of Petroleum Science and Engineering, vol. 123, Aug. 23, 2014, pp. 164-171.

Gabriella Sanniti di Baja, Jose Francisco Martinez-Trinidad et al., "Skeletonization of Digital Objects," Progress in Pattern Recognition, Image Analysis and Applications Lecture Notes in Computer Science, LNCS, Springer, Berlin, DE, Jan. 1, 2006, pp. 1-13.

Silin, Dmitry B. et al., "Robust Determination of the Pore Space Morphology in Sedimentary Rocks," SPE Annual Technical Conference and Exhibition, Denver, CO, 2003, pp. 1-15.

Kumar, M. et. al., "Variations in the Archie's Exponent: Probing Wettability and Low Sw Effects," SPWLA 51st Annual Logging Symposium, 2010, pp. 1-12.

Han, M, et. al., "The Effect of the Porous Structure on Resistivity Index Curves. An Experimental and Numerical Study.," SPWLA 49th Annual Logging Symposium, 2008, pp. 1-10.

Yanici, Sefer, "Laboratory Analysis of the Predictive Value of Image-Based Computations for Resistivity Index," PhD Thesis, University of New South Wales, Australia, 2011, 173 pages.

Hilpert, M. et al., "Pore-morphology-based simulation of drainage in totally wetting porous media," Advances in Water Resources, 24, 2001, pp. 243-255.

Arns, C. H. et al., "Cross-property correlations and permeability estimation in sandstone," Physical Review E 72, 046304, 2005, pp. 1-12.

Adalsteinsson, D. et al., "Accurate and efficient implementation of PoreMorphology-based drainage modeling in two-dimensional porous media," Transport in Porous Media, 65, 2006, pp. 337-358.

Silin, D. et al., "Pore space morphology analysis using maximal inscribed spheres," Physica A, 371, 2006, pp. 336-360.

Sakellariou, A. et al., "An x-ray tomography facility for quantitative prediction of mechanical and transport properties in geological, biological and synthetic systems," Proceedings of SPIE, vol. 5535, Developments in X-Ray Tomography IV, SPIE, Bellingham, WA, 2004, pp. 473-484.

Fredrich, et al. "Digital Rocks: Developing an Emerging Technology Through to a Proven Capability Deployed in the Business," SPE 170752-MS, Amsterdam, The Netherlands, Oct. 27-29, 2014, pp. 1-17.

* cited by examiner

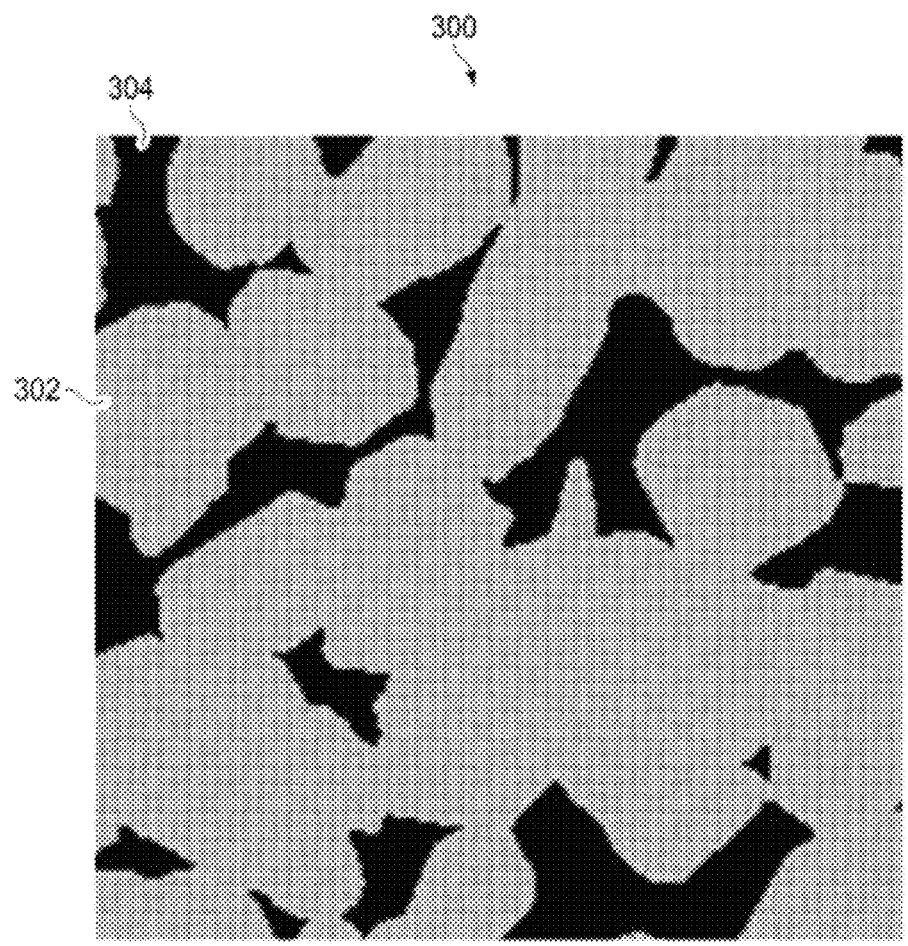
FIG. 3B
FIG. 4
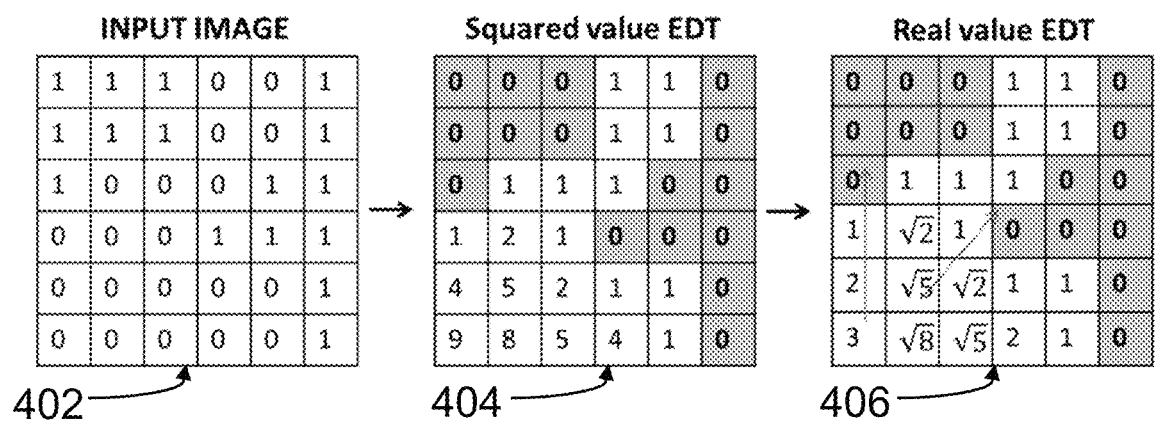

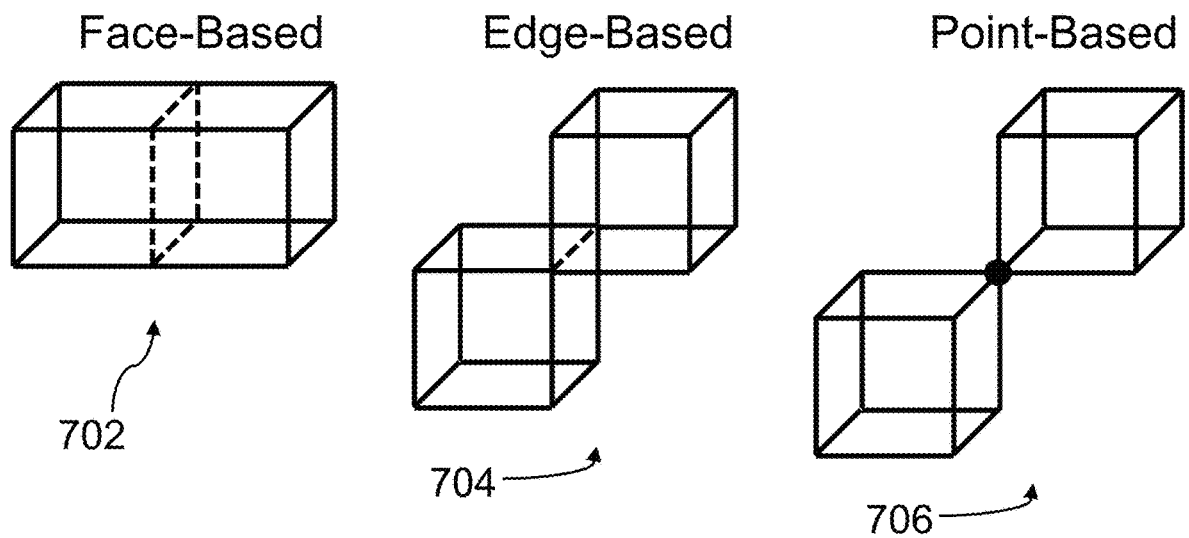
FIG. 7
FIG. 8
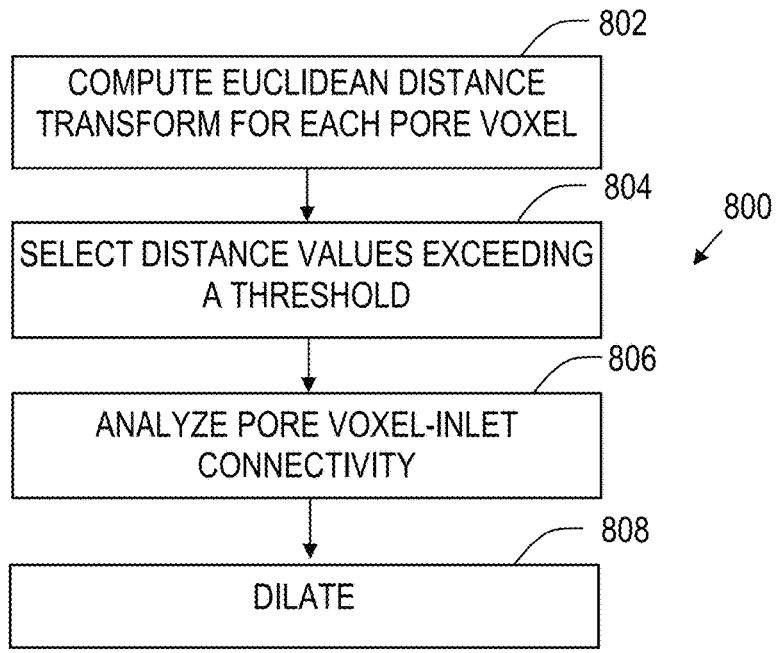

DIRECT NUMERICAL SIMULATION OF PETROPHYSICAL PROPERTIES OF ROCKS WITH TWO OR MORE IMMICIBLE PHASES

CROSS-REFERENCE TO RELATED APPLICATIONS

This application claims priority to U.S. Provisional Patent Application No. 62/415,050, filed Oct. 31, 2016. The disclosure of which is hereby incorporated herein by reference in its entirety.

BACKGROUND

In hydrocarbon production, obtaining accurate subsurface estimates of petrophysical properties of the rock formations is important for the assessment of hydrocarbon volumes contained in the rock formations and for formulating a strategy for extracting the hydrocarbons from the rock formation. Traditionally, samples of the rock formation, such as from core samples or drilling cuttings, are subjected to physical laboratory tests to measure petrophysical properties such as permeability, porosity, formation factor, elastic moduli, and the like. Some of these measurements require long time periods, extending over several months in some cases, depending on the nature of the rock itself. The equipment used to make these measurements can also be quite costly.

Because of the cost and time required to directly measure petrophysical properties, the technique of "direct numerical simulation" can be applied to efficiently estimate physical properties, such as porosity, absolute permeability, relative permeability, formation factor, elastic moduli, and the like of rock samples, including samples from difficult rock types such as tight gas sands or carbonates. According to this approach, a three-dimensional tomographic image of the rock sample is obtained, for example by way of a computer tomographic (CT) scan. Voxels in the three-dimensional image volume are "segmented" (e.g., by "thresholding" their brightness values or by another approach) to distinguish rock matrix from void space. Direct numerical simulation of fluid flow or other physical behavior such as elasticity or electrical conductivity is then performed, from which porosity, permeability (absolute and/or relative), elastic properties, electrical properties, and the like can be derived. A variety of numerical methods may be applied to solve or approximate the physical equations simulating the appropriate behavior. These methods include the Lattice-Boltzmann, finite element, finite difference, finite volume numerical methods and the like.

BRIEF DESCRIPTION OF THE DRAWINGS

For a detailed description of exemplary embodiments, reference will now be made to the accompanying drawings, which may not be drawn to scale, in which:

FIG. 3B shows a digital representation of the rock sample of FIG. 3A in accordance with various embodiments disclosed herein.

FIG. 4 shows an example of a Euclidean distance transform performed on a digital representation of a rock sample in accordance with principles disclosed herein;

FIG. 7 shows an example of a connections in digital representation of a rock sample that are identified by a connected components transform in accordance with principles disclosed herein;

FIG. 8 shows a flow diagram for a drainage process performed on a digital representation of a rock sample in accordance with principles disclosed herein;

NOTATION AND NOMENCLATURE

Figure 1A:
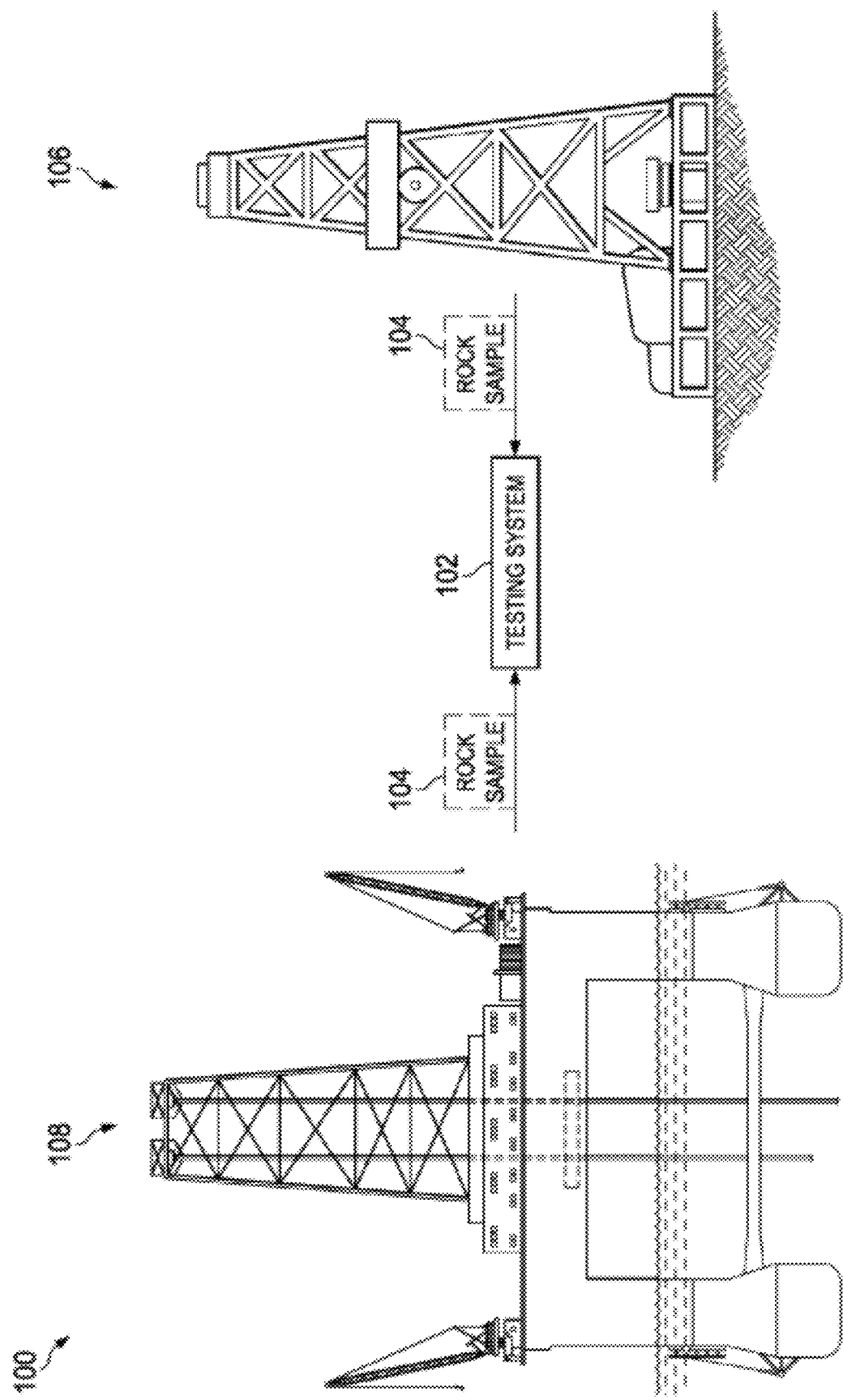
FIG. 1A is a schematic level diagram that illustrates examples of sources of rock samples for a testing system constructed and operating in accordance with principles disclosed herein.

In the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of additional factors.

DETAILED DESCRIPTION

In the drawings and description that follow, like parts are typically marked throughout the specification and drawings with the same reference numerals. The drawing figures are not necessarily to scale. Certain features of embodiments may be shown exaggerated in scale or in somewhat schematic form, and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings and components of the embodiments discussed below may be employed separately or in any suitable combination to produce desired results.

Typically, the petrophysical properties derived from direct numerical simulation assume that the pore space of the rock is fully saturated by one fluid. However, the pore space of subsurface rock is often populated by two or more fluids and hydrocarbon recovery processes such as water injection/gas drive and extraction of hydrocarbons subsequently alters subsurface pore fluid distribution. The presence of multiple immiscible pore fluids, such as water, oil and/or gas, within the pore space of a rock, can significantly impact petrophysical properties, such as electrical conductivity, effective permeability and relative permeability used to characterize oil and gas reservoirs. Unfortunately, conventional direct numerical simulations for estimation of petrophysical properties fail to account for the presence of multiple fluids in the pore space.

Embodiments of the present disclosure determine the petrophysical properties of rock saturated with two or more immiscible phases using direct numerical simulation by populating two or more fluids within the pore space of the rock using numerical techniques. The numerical techniques for populating the pore space are based on morphological algorithms and approximate fluid saturation processes like drainage and imbibition. Direct numerical simulations for computation of petrophysical properties then operate on a computational domain that explicitly assigns relevant physical properties of fluids such as fluid viscosity, fluid density, and/or fluid conductivity appropriate for each fluid type, and/or relevant physical properties such as contact angle to the solid face adjacent to one or more fluid phase cells in a computational model.

The morphological algorithms utilized by the embodiments disclosed herein to populate the pore space with different fluids correlate to saturation processes that occur in the subsurface. It is important to have a method of saturating the rock that mirrors real fluid saturation processes as these processes control both the volume fraction and the spatial distribution of pore fluids within the pore space. Algorithms for populating the pore space of the rock with pore fluids that do not produce physically reasonable fluid distribution patterns do not result in simulated petrophysical properties of high fidelity. For instance, merely assuming that each pore is fractionally occupied by two or more fluids will result in misleading electrical properties.

FIG. 1A illustrates, at a high level, the acquiring of rock samples and the analysis of the rock samples according to principles disclosed herein. Embodiments of present disclosure may be especially beneficial in analyzing rock samples from sub-surface formations that are important in the production of oil and gas. As such, FIG. 1A illustrates environments 100 from which rock samples 104 to be analyzed by testing system 102 can be obtained, according to various implementations. In these illustrated examples, rock samples 104 can be obtained from terrestrial drilling system 106 or from marine (ocean, sea, lake, etc.) drilling system 108, either of which is utilized to extract resources such as hydrocarbons (oil, natural gas, etc.), water, and the like. As is fundamental in the art, optimization of oil and gas production operations is largely influenced by the structure and physical properties of the rock formations into which terrestrial drilling system 106 or marine drilling system 108 is drilling or has drilled in the past.

The manner in which rock samples 104 are obtained, and the physical form of those samples, can vary widely. Examples of rock samples 104 useful in connection with embodiments disclosed herein include whole core samples, side wall core samples, outcrop samples, drill cuttings, and laboratory generated synthetic rock samples such as sand packs and cemented packs.

As illustrated in FIG. 1A, the environment 100 includes testing system 102 that is configured to analyze images 128 (FIG. 1B) of rock samples 104 in order to determine the physical properties of the corresponding sub-surface rock, such properties including petrophysical properties in the context of oil and gas exploration and production.

Figure 1B:
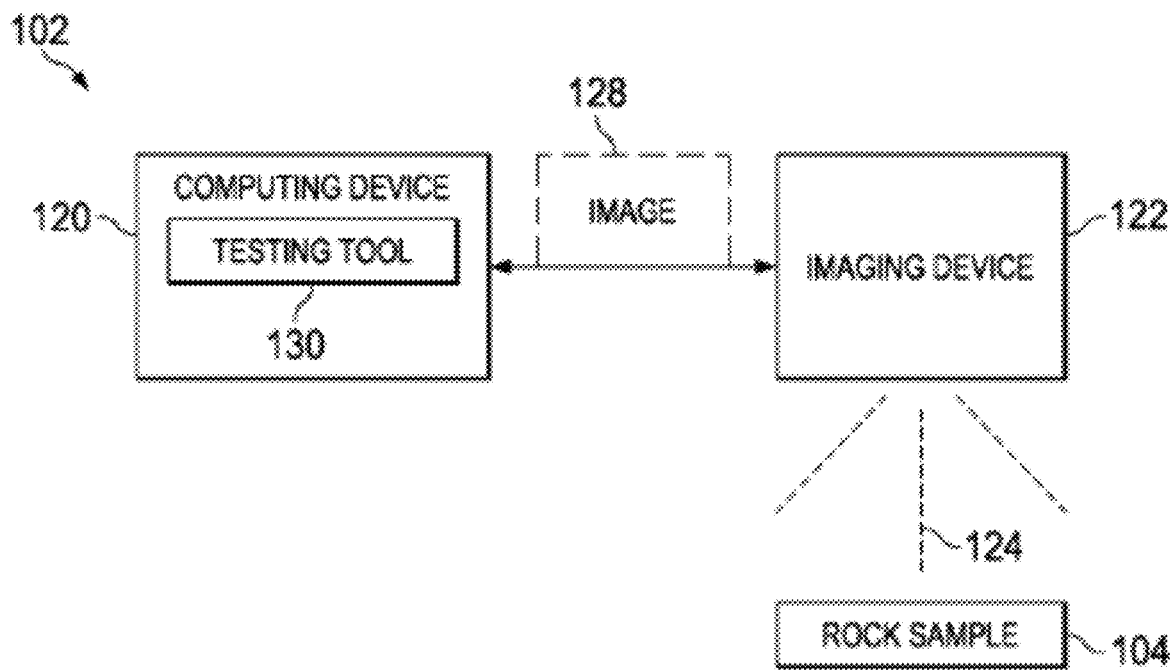
FIG. 1B shows a block diagram for a testing system for analyzing rock samples in accordance with principles disclosed herein.

FIG. 1B illustrates, in a generic fashion, the constituent components of the testing system 102 that analyzes images 128. In a general sense, testing system 102 includes imaging device 122 for obtaining two-dimensional (2D) or three-dimensional (3D) images, as well as other representations, of rock samples 104, such images and representations including details of the internal structure of the rock samples 104. An example of imaging device 122 is an X-ray computed tomography (CT) scanner, which, as known in the art, emits x-ray radiation 124 that interacts with an object and measures the attenuation of that x-ray radiation 124 by the object in order to generate an image of its interior structure and constituents. The particular type, construction, or other attributes of CT scanner 122 can correspond to that of any type of x-ray device, such as a micro CT scanner, capable of producing an image representative of the internal structure of rock sample 104. The imaging device 122 generates one or more images 128 of rock sample 104, and forwards those images 128 to a computing device 120.

The images 128 produced by imaging device 122 may be in the form of a three-dimensional (3D) digital image volume (i.e., a digital rock) consisting of or generated from a plurality of two-dimensional (2D) sections of rock sample 104. In this case, each image volume is partitioned into 3D regular elements called volume elements, or more commonly "voxels". In general, each voxel is cubic, having a side of equal length in the x, y, and z directions. Digital image volume 128 itself, on the other hand, may contain different numbers of voxels in the x, y, and z directions. Each voxel within a digital volume has an associated numeric value, or amplitude, that represents the relative material properties of the imaged sample at that location of the medium represented by the digital volume. The range of these numeric values, commonly known as the grayscale range, depends on the type of digital volume, the granularity of the values (e.g., 8 bit or 16 bit values), and the like. For example, 16 bit data values enable the voxels of an x-ray tomographic image volume to have amplitudes ranging from 0 to 65,536 with a granularity of 1.

As mentioned above, imaging device 122 forwards images 128 to computing device 120, which in the example of FIG. 1B may be any type of computing device, for example, a desktop computer or workstation, a laptop computer, a server computer, a tablet computer, and the like. As such computing device 120 will include hardware and software components typically found in a conventional computing device. As shown in FIG. 1B, these hardware and software components of computing device 120 include a testing tool 130 that is configured to analyze images 128 to determine the petrophysical properties of rock sample 104 under one or more simulated fluid saturation conditions, including fluid saturation conditions that may be encountered by rock formations in the sub-surface. In this regard, the testing tool 130 may be implemented as software, hardware, or a combination of both, including the necessary and useful logic, instructions, routines, and algorithms for performing the functionality and processes described in further detail herein. In a general sense, testing tool 130 is configured to analyze image volume 128 of rock sample 104 to perform direct numerical simulation of the petrophysical properties under fluid saturation conditions representing subsurface conditions of rock formations, including variation degrees of saturation with multiple fluids.

Figure 1C:
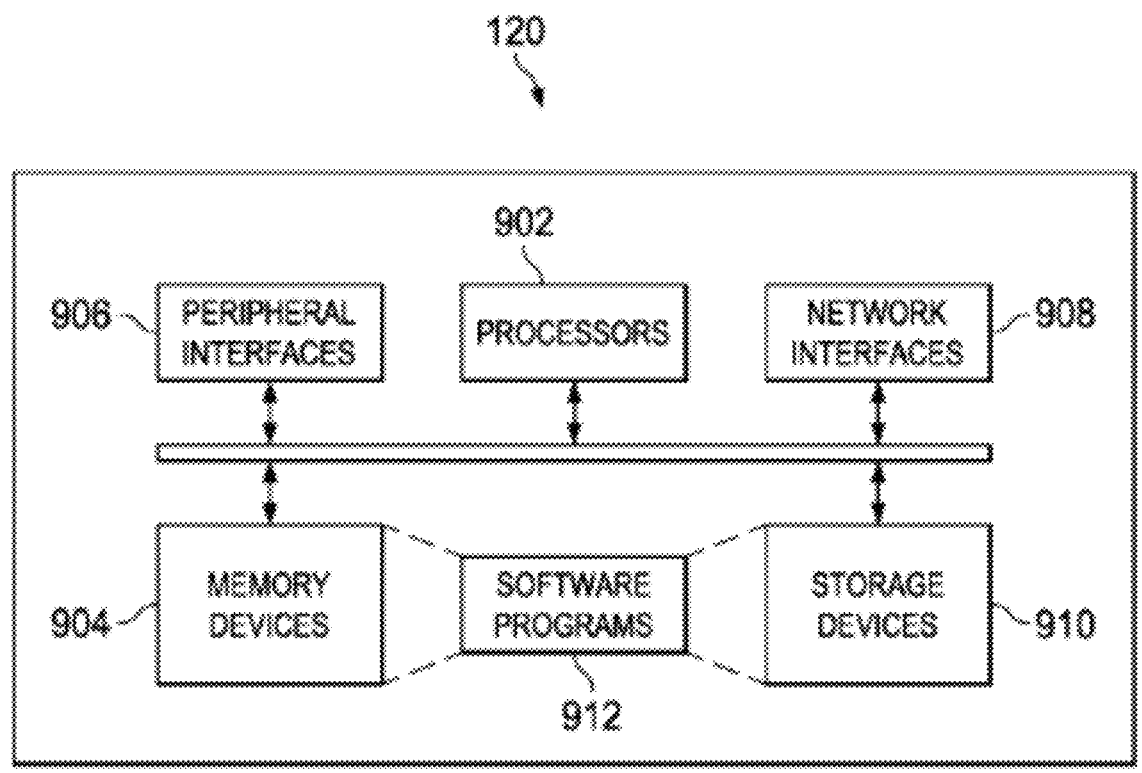
FIG. 1C shows a block diagram for a computing device suitable for use in a testing system for analyzing rock samples in accordance with principles disclosed herein.

FIG. 1C generically illustrates the architecture of computing device 120 in testing system 102 according to various embodiments. In this example architecture, computing device 120 includes one or more processors 902, which may be of varying core configurations and clock frequencies as available in the industry. The memory resources of computing device 120 for storing data and/or program instructions for execution by the one or more processors 902 include one or more memory devices 904 serving as a main memory during the operation of computing device 120, and one or more storage devices 910, for example realized as one or more of non-volatile solid-state memory, magnetic or optical disk drives, or random access memory. One or more peripheral interfaces 906 are provided for coupling to corresponding peripheral devices such as displays, keyboards, mice, touchpads, touchscreens, printers, and the like. Network interfaces 908, which may be in the form of Ethernet adapters, wireless transceivers, serial network components, etc. are provided to facilitate communication between computing device 120 via one or more networks such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), and the like. In this example architecture, processors 902 are shown as coupled to components 904, 906, 908, and 910 by way of a single bus; of course, a different interconnection architecture such as multiple, dedicated, buses and the like may be incorporated within computing device 120.

While illustrated as a single computing device, computing device 120 can include several computing devices cooperating together to provide the functionality of a computing device. Likewise, while illustrated as a physical device, computing device 120 can also represent abstract computing devices such as virtual machines and "cloud" computing devices.

As shown in the example implementation of FIG. 1C, the computing device 120 includes software programs 912 including one or more operating systems, one or more application programs, and the like. According to embodiments, software programs 912 include program instructions corresponding to testing tool 130 (FIG. 1B), implemented as a standalone application program, as a program module that is part of another application or program, as the appropriate plug-ins or other software components for accessing testing tool software on a remote computer networked with computing device 120 via network interfaces 908, or in other forms and combinations of the same.

The program memory storing the executable instructions of software programs 912 corresponding to the functions of testing tool 130 may physically reside within computing device 120 or at other computing resources accessible to computing device 120, i.e. within the local memory resources of memory devices 904 and storage devices 910, or within a server or other network-accessible memory resources, or distributed among multiple locations. In any case, this program memory constitutes a non-transitory computer-readable medium that stores executable computer program instructions, according to which the operations described in this specification are carried out by computing device 120, or by a server or other computer coupled to computing device 120 via network interfaces 908 (e.g., in the form of an interactive application upon input data communicated from computing device 120, for display or output by peripherals coupled to computing device 120). The computer-executable software instructions corresponding to software programs 912 associated with testing tool 130 may have originally been stored on a removable or other non-volatile computer-readable storage medium (e.g., a DVD disk, flash memory, or the like), or downloadable as encoded information on an electromagnetic carrier signal, in the form of a software package from which the computer-executable software instructions were installed by computing device 120 in the conventional manner for software installation. It is contemplated that those skilled in the art will be readily able to implement the storage and retrieval of the applicable data, program instructions, and other information useful in connection with this embodiment, in a suitable manner for each particular application, without undue experimentation.

The particular computer instructions constituting software programs 912 associated with testing tool 130 may be in the form of one or more executable programs, or in the form of source code or higher-level code from which one or more executable programs are derived, assembled, interpreted or compiled. Any of a number of computer languages or protocols may be used, depending on the manner in which the desired operations are to be carried out. For example, these computer instructions for creating the model according to embodiments may be written in a conventional high level language such as PYTHON, JAVA, FORTRAN, or C++, either as a conventional linear computer program or arranged for execution in an object-oriented manner. These instructions may also be embedded within a higher-level application. In any case, it is contemplated that those skilled in the art having reference to this description will be readily able to realize, without undue experimentation, embodiments in a suitable manner for the desired installations.

The particular functions of testing tool 130, including those implemented by way of software programs 912, to analyze rock samples under various saturation conditions according to embodiments, will now be described with reference to the FIG. 2 in combination with FIGS. 1A through 1C.

Figure 2:
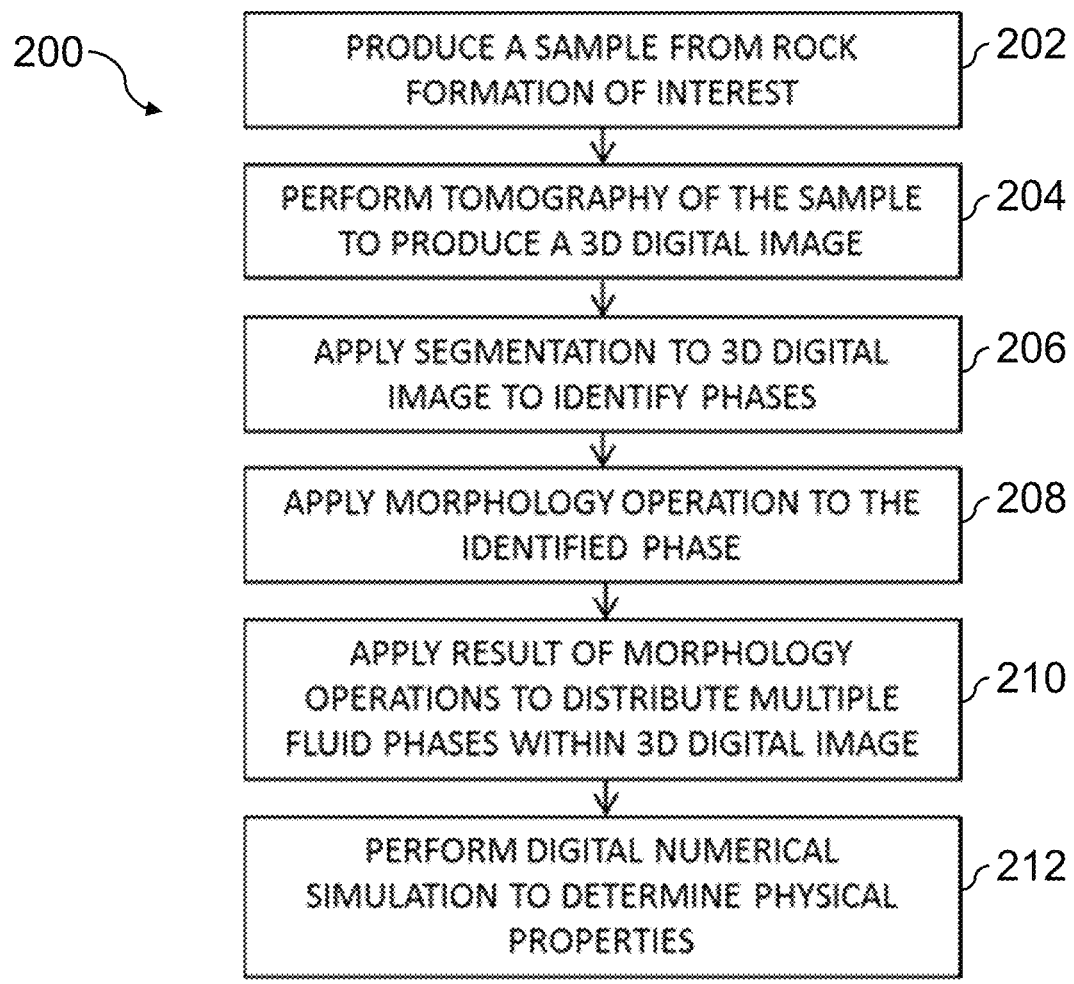
FIG. 2 shows a flow diagram for a method for analyzing rock samples under various saturation conditions in accordance with principles disclosed herein.

FIG. 2 shows a flow diagram for a method 200 for analyzing rock samples under various saturation conditions in accordance with principles disclosed herein. Though depicted sequentially as a matter of convenience, at least some of the actions shown can be performed in a different order and/or performed in parallel. Additionally, some embodiments may perform only some of the actions shown. In some embodiments, at least some of the operations of the method 200, as well as other operations described herein, can be implemented as instructions stored in a computer readable medium and executed by one or more processors 902.

In block 202, the testing system 102 acquires rock sample 104 to be analyzed, such as from a sub-surface rock formation obtained via terrestrial drilling system 106 or marine drilling system 108, or from other sources. The specific rock sample 104 may be prepared from a larger volume of the sub-surface rock formation, to be of a size, dimension, and configuration that may be imaged by imaging device 122 (e.g., a CT scanner), for example by drilling or cutting out a portion of the larger volume of the rock formation of interest.

In block 204, imaging device 122 in combination with computing device 120 of testing system 102 generates digital image volume 128 representative of rock sample 104, including its interior structure. For example, if the imaging device 122 is a CT scanner, then X-ray imaging of rock sample 104 is performed (i.e., emitting radiation directed at rock sample 104 and measuring the attenuation) to generate image volumes 128 of or from 2D slice images. Specific conventional techniques for acquiring and processing 3D digital image volumes 128 of rock sample 104 in block 204 include, without limitation, X-ray tomography, X-ray microtomography, X-ray nano-tomography, Focused Ion Beam Scanning Electron Microscopy, and Nuclear Magnetic Resonance. In some embodiments, the digital image volume 128 may be computationally generated rather than produced by scanning a physical specimen. In embodiments in which the digital image volume 128 is produced by scanning a rock specimen, the rock specimen may be a naturally occurring rock or a man-made porous material (e.g., a synthetic rock).

Figure 3A:
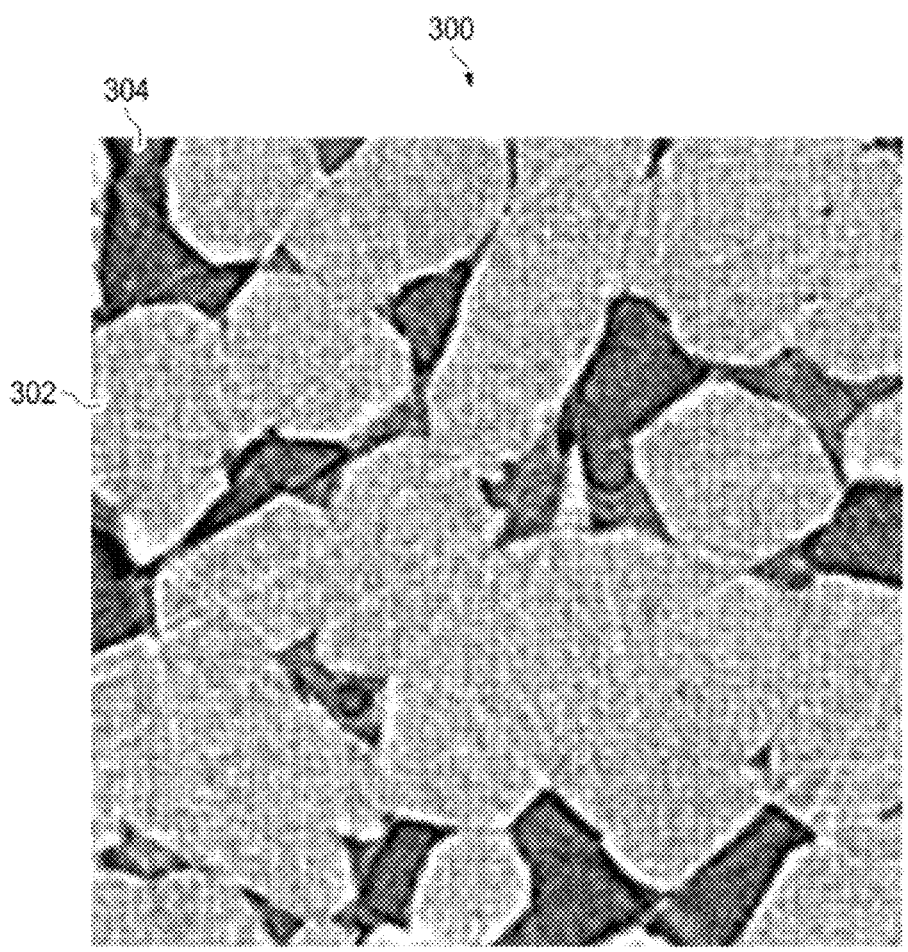
FIG. 3A shows a cross-sectional microphotograph of a rock sample suitable for use with various embodiments disclosed herein.

FIG. 3A illustrates an example of one 2D slice image 300 of a 3D image of a rock sample, which shows a cross-sectional slice of the structural details of that rock sample, including the features of solid material 302 and pore or void space 304. The image data at this point may be in the form of grayscale values representative of the attenuation of the x-ray radiation by the constituents of rock sample 104. While FIG. 3A illustrates one 2D slice image 300, 3D digital image volume 128 of rock sample 104 is typically composed of multiple 2D slice images at locations stepped along one axis of rock sample 104, together forming a 3D image of rock sample 104. The combining of the 2D slice images into 3D digital image volume 128 may be performed by computational resources within imaging device 122 itself, or by computing device 120 from the series of 2D slice images 128 produced by imaging device 122, depending on the particular architecture of testing system 102.

In block 206, the testing system 102 performs segmentation or other image enhancement techniques on digital image volume 128 of rock sample 104 to distinguish and label different components or phases of image volume 128 from the grayscale values of the image. More specifically, computing device 120 performs this segmentation in order to identify components, such as pore space and mineralogical components (e.g., clays and quartz). In some embodiments, testing tool 130 is configured to segment image volume 128 into more than two significant phases, representing such material constituents as pore space, clay fraction, quartz fraction, and other various mineral types.

The computing device 120 can utilize any of a number of types of segmentation algorithms. One approach to segmentation is the application of a "thresholding" process to image volume 128, in which computing device 120 chooses a threshold value within the voxel amplitude range. Those voxels having an amplitude below the threshold value are assigned one specific numeric value that denotes pore space, while those voxels having an amplitude above the threshold are assigned another numeric value that denotes matrix space (i.e., solid material). In this approach, thresholding converts a grayscale image volume to a segmented volume of voxels having one of two possible numeric values, commonly selected to be 0 and 1. FIG. 3B illustrates an example of the segmentation performed on a 3D digital image volume via thresholding. As illustrated, segmentation allows the structural details of a rock sample to be distinguished, in this example with the solid material 302 shown in light gray, and pores or void space 304 shown in black. Further segmentation can be applied one or more times to differentiate various features within a grayscale image. If simple thresholding is used, multiple threshold values can distinguish among different materials exhibiting different x-ray attenuation characteristics, such as clay, quartz, feldspar, etc.

Computing device 120 may alternatively utilize other segmentation algorithms. An example of such an alternative algorithm is known in the art as Otsu's Method, in which a histogram based thresholding technique selects a threshold to minimize the combined variance of the lobes of a bimodal distribution of grayscale values (i.e., the "intra-class variance"). Otsu's method can be readily automated, and may also be extended to repeatedly threshold the image multiple times to distinguish additional material components such as quartz, clay, and feldspar. Other examples of automated segmentation algorithms of varying complexity may alternatively or additionally be used by computing device 120 to distinguish different features of an image volume, such algorithms including Indicator Kriging, Converging Active Contours, Watershedding, and the like.

The computing device 120 may also utilize other image enhancement techniques to enhance or improve the structure defined in image volume 128 to further differentiate among structure, to reduce noise effects, and the like. Likewise, while computing device 120 can perform the segmentation or other image enhancement techniques, it is contemplated that other components of testing system 102, for example imaging device 122 itself, may alternatively perform image enhancement in whole or in part.

Segmentation thus associates the voxels in the digital image volume with the particular material (or pore space, as the case may be) at the corresponding location within rock sample 104. Some or all of the voxels are each labeled with one or more material properties corresponding to the particular material constituent assigned to that voxel. Such constituents including pore space, matrix material, clay fraction, individual grains, grain contacts, mineral types, and the like.

In block 208, the computing device 120 applies a morphology operation to the identified phases of the digital image volume 128 that represents the rock sample 104. The morphological operation performed by the computing device 120 may include one or more of a distance transform, an inscribed spheres transform, and a connected components transform. Additional details of morphological operations performed by the computing device 120 are provided in FIGS. 4-7 and associated text herein.

In block 210, the computing device 120 applies results of the morphology operations of block 208 to distribute multiple fluid phases within the digital image volume 128 that represents the rock sample 104. Distribution of multiple fluid phases may include saturating the digital image volume with varying ratios of wetting to non-wetting fluids. Using a digital image volume saturated with two or more immiscible fluid phases as input to digital direct numerical simulation enables the prediction of multiphase rock properties, where multiphase rock properties depend on the relative location of the two (or more) fluids in the pore space. The fluid distribution operations may include drainage and imbibition. Additional details of the fluid distribution operations performed by the computing device 120 are provided in FIG. 8 and associated text herein.

In block 212, the computing device 120 numerically analyzes the saturated digital image volume 128 to determine physical properties of the rock 104. Numerically analyzing the digital image volume 128 may include performing digital direct numerical simulation of the digital image volume 128 as saturated in block 210 to analyze one or more physical properties of the rock sample 104 under the simulated fluid saturation conditions. In the context of oil and gas exploration and production, petrophysical properties of interest such as porosity, formation factor, absolute and relative permeability, electrical properties (such as formation factor, cementation exponent, saturation exponent, tortuosity factor), capillary pressure properties (such as mercury capillary injection), elastic moduli and properties (such as bulk modulus, shear modulus, Young's modulus, Poisson's ratio, Lame constants), nuclear magnetic resonance properties, and the like, may be determined in block 212. These petrophysical properties may be estimated using an appropriate discretization of the digital image volume 128 combined with appropriate direct numerical simulation, e.g. the direct numerical simulation of single phase fluid flow for computation of absolute permeability. The determination of some of these petrophysical properties may also require direct numerical simulation using finite element methods, finite difference methods, finite volume methods, Lattice Boltzmann methods or any variety of other numerical approaches. Relationships of different petrophysical properties of the material represented by digital image volume 128 with porosity, or relationships of other pairs of those properties, may also be estimated.

Returning now to block 208 of FIG. 2, the computing device 120 may apply any of a variety of morphology operations to the identified phases of the digital image volume 128 that represents the rock sample 104. The morphology operations applied may include a distance transform, an inscribed spheres transform, and/or a connected components transform. A distance transform, when applied to a target phase (e.g., pore or solid) will label all voxels in the target phase with a value signifying a distance to a background phase (i.e., a voxel of a non-target phase). Thus, if the target phase is pore space, then the distance transform creates a map of distance from each pore voxel to a closest solid voxel. The distance map can be used to identify pore phase voxels that are adjacent to a pore-grain, pore-clay interface in a digital rock. Wetting films are typically below the resolution of CT scans, so the distance map can be used to identify regions of the pore space adjacent to a solid surface where fluid films would reside. Using the distance map the thickness of a film can be adjusted. The process of film thickening is likened to an imbibition process, where the saturation of the wetting phase is increasing. A distance transform can be implemented using a variety of approaches. The present disclosure describes the Euclidian Distance Transform and the Manhattan Distance Transform (also known as City-Block). Some embodiments may apply any of a variety of other distance transforms to create a distance map.

FIG. 4 shows an example of a Euclidean distance transform performed on a digital representation of a rock sample in accordance with principles disclosed herein. In FIG. 4, the Euclidean Distance Transform is illustrated in two dimensions to promote clarity, but in practice may be implemented in three dimensions in the method 200. FIG. 4 shows an input image 402 to be transformed, a squared value Euclidian Distance Transform 404 of the input image 402, and a real valued Euclidian Distance Transform 406 corresponding to the squared value Euclidian Distance Transform 404. In the input image 402, pore space pixels are represented by the value "0," and solid space pixels are represented by the value "1." For each pore space pixel, the Euclidian Distance Transform identifies the nearest solid space pixel, and calculates the distance between the two pixels via the Pythagorean Theorem.

In the squared value Euclidian Distance Transform 404 of the input image 402, each pore space pixel value "0" is replaced by the squared value of the distance from the pore space pixel to the nearest solid space pixel. Each of the solid space pixels is denoted as "0" in 404. The Euclidian Distance Transform may assume that the distance between adjacent voxels in orthogonal directions is equal to one voxel dimension, which ensures that the squared value Euclidian Distance Transform 404, obtained by taking the square of the Euclidian Distance Transform value (denoted as the real valued Euclidian Distance Transform 406), is always an integer. The use of the squared value Euclidian Distance Transform 404 is advantageous because integer values allow for programming logic that is more precise than that dealing with real numbers. While the Euclidian Distance Transform has been described as distance from pore space voxels to solid space voxels, some embodiments may apply the Euclidian Distance Transform to determine distance from each solid space voxel to a nearest pore space voxel.

Figure 5:
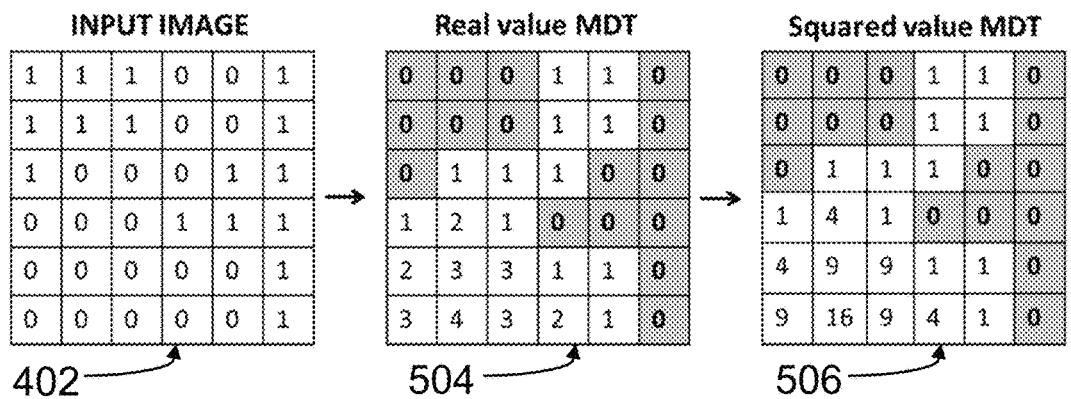
FIG. 5 shows an example of a Manhattan distance transform performed on a digital representation of a rock sample in accordance with principles disclosed herein.

FIG. 5 shows an example of a Manhattan distance transform performed on a digital representation of a rock sample in accordance with principles disclosed herein. In FIG. 5, the Manhattan Distance Transform is illustrated in two dimensions to promote clarity, but in practice may be implemented in three dimensions in the method 200. FIG. 5 shows an input image 402 to be transformed, a real value Manhattan Distance Transform 504 of the input image 402, and a squared value Manhattan Distance Transform 506 corresponding to the real value Manhattan Distance Transform 504. In the input image 402, pore space pixels are represented by the value "0," and solid space pixels are represented by the value "1." In the real value Manhattan Distance Transform 504 and squared value Manhattan Distance Transform 506, solid space pixels are represented by the value "0." The Manhattan Distance Transform may also be referred to as the City-Block Distance. The Manhattan Distance Transform assumes that the distance between adjacent voxels in orthogonal directions is equal to one voxel dimension. The value assigned to a pixel is equal to the minimum distance in one of the Cartesian directions. For an n-dimensional image, the distance assigned to a pore space pixel is equal to the minimum distance from the pore space pixel to the nearest solid space pixel in any of the n-directions. Thus, in the real value Manhattan Distance Transform 504 each pore space pixel value is replaced by a distance in one direction (X or Y) to a nearest solid space pixel. In the squared valued Manhattan Distance Transform 506, the distance values of real value Manhattan Distance Transform 504 are squared.

The distance value assigned to a pixel by the Manhattan Distance Transform may be greater than or equal to the corresponding Euclidian Distance Transform value because in the Manhattan Distance Transform the nearest neighbor search is constrained to the n-directions of the n-dimensional image. However, because the Manhattan Distance Transform constrains the nearest neighbor search to the n-directions of the n-dimensional image, the Manhattan Distance Transform may be more computationally efficient than the Euclidian Distance Transform. While the Manhattan Distance Transform has been described as distance from pore space voxels to solid space voxels, some embodiments may apply the Manhattan Distance Transform to determine distance from each solid space voxel to a nearest pore space voxel.

The Maximum Inscribed Spheres Transform is another morphology operation that may be applied to the identified phases of the digital image volume 128 that represents the rock sample 104. The Maximum Inscribed Spheres Transform provides information about the structure of a porous material that can be used to distribute two or more immiscible fluids in a digital rock. The Maximum Inscribed Spheres transform applied to a target phase (e.g., pore or solid) will assign to each voxel of the target phase a value equal to the largest sphere that covers that point, and is contained within the target phase. The size of the sphere for a given voxel can be estimated from a distance transform, such as the Euclidian Distance Transform or Manhattan Distance Transform described herein. When using the Euclidian Distance Transform the sphere will be entirely contained within the pore space. Using an alternative distance transform, for example, the Manhattan Distance Transform or an estimated Euclidian Distance Transform, it is possible to produce an MIS transform where the maximum covering sphere does overlap with the background phase (i.e., the non-target phase).

Figure 6:
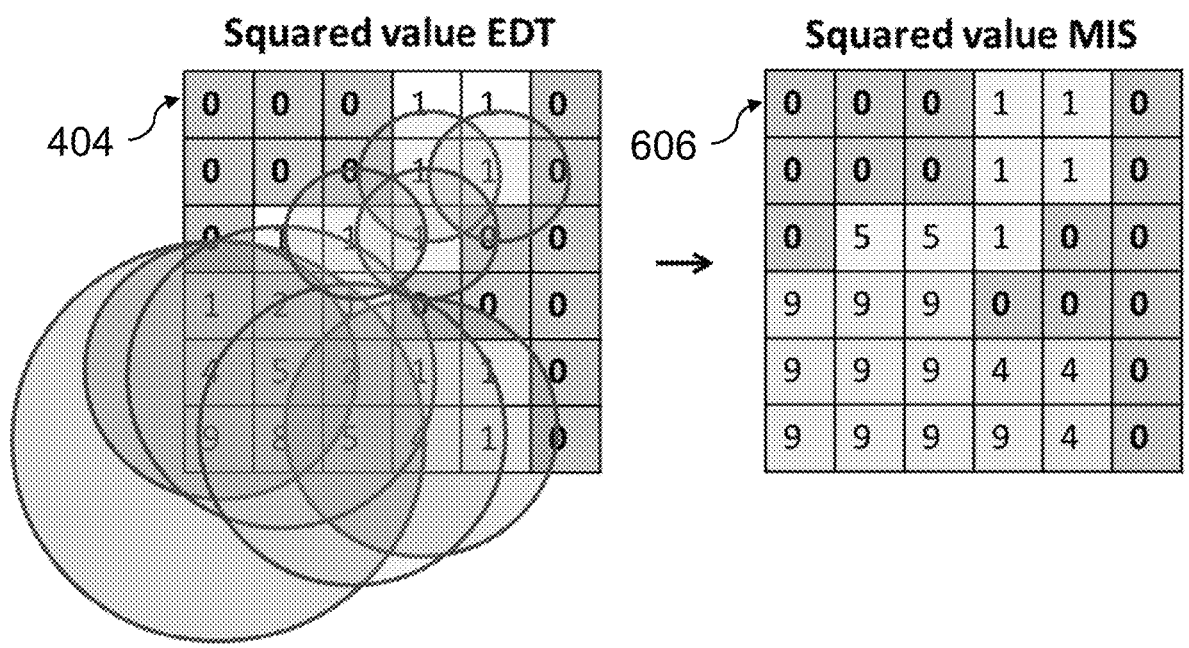
FIG. 6 shows an example of a maximum inscribe spheres transform performed on a digital representation of a rock sample in accordance with principles disclosed herein.

FIG. 6 shows an example of a Maximum Inscribed Spheres Transform performed on a digital representation of a rock sample in accordance with principles disclosed herein. In FIG. 6, the Maximum Inscribed Spheres Transform is illustrated in two dimensions to promote clarity, but in practice may be implemented in three dimensions in the method 200. FIG. 6 shows the squared value Euclidian Distance Transform 404 of the input image 402, and a squared valued Maximum Inscribed Spheres Transform 606 corresponding to the squared value Euclidian Distance Transform 404. In squared value Euclidian Distance Transform 404 and a squared valued Maximum Inscribed Spheres Transform 606, solid space pixels are represented by the value "0."

In FIG. 6, for each pore space pixel, a circle of radius equal to the square root of the squared Euclidian Distance Transform value of the pixel is centered at the pixel center. The Maximum Inscribed Spheres Transform value for a pixel is deemed to be the squared Euclidian Distance Transform value that produces the largest circle that covers the pixel. In three dimensions, spheres, rather than circles, are employed. The Maximum Inscribed Spheres Transform can be varied based on the distance map used to calculate the distance between voxels of different phases.

Allowing the covering sphere of the Maximum Inscribed Spheres Transform, when applied to the pore space of a digital rock, to overlap (as shown in FIG. 6) with the background phase, when the background phase is assumed to be a solid or microporous phase, creates a fluid-fluid interface in the vicinity of the background phase that can be characterized by an angle. By varying the amount of overlap with the background phase the angle characterizing the fluid-fluid interface in the vicinity of the background phase can be varied.

The Maximum Inscribed Spheres Transform can be used to create the distribution of a non-wetting fluid phase by an image processing technique known as thresholding. Using a given threshold value, based on the values contained in the Maximum Inscribed Spheres Transform, all pixel/voxel values greater than or equal to the threshold value can be assigned to the non-wetting phase. Similarly, all values less than the threshold, and residing in the phase originally considered the target phase for the Maximum Inscribed Spheres Transform, can be assigned to the wetting phase. By selecting different threshold values, different distributions of two or more immiscible fluid phases within the digital rock can be created. The saturation of a phase is often defined as a percentage. The percentage is typically defined as the volume of a phase, divided by the volume available for that phase to occupy (e.g., volume of pore space occupied by a fluid divided by total volume of pore space). For example, water saturation is determined by the volume of water occupying the pore space, divided by the total volume of the pore space.

The Connected Components Transform in another morphology operation that may be applied to the identified phases of the digital image volume 128 that represents the rock sample 104. The Connected Components Transform identifies pixel/voxel groups that are connected. For example, the Connected Components Transform may be applied to identify pore space voxels that are connected. The results of the Connected Components Transform can be used to restrict the distribution of two or more immiscible fluids to regions of the pore space that are connected, or to regions of the pore space that are disconnected.

The Connected Components Transform, also referred to as cluster identification, identifies groups of voxels in a target phase that are connected according to one of three possible connectivity rules that can be defined by a connectivity number of 6, 18, or 26. The connectivity number identifies the number of voxels that are included in a neighbor search at each point, and can be visualized by considering each voxel as a cubic element with 8 nodes. FIG. 7 shows examples of three different connectivity rules applied in a Connected Components Transform performed on a digital representation of a rock sample in accordance with principles disclosed herein. Face-based connectivity (option 6) is illustrated in 702. In face-based connectivity, two voxels are identified as sharing a common face, or a minimum of four nodes (denoted in dashed lines in 702). Edge-based connectivity (option 18) is illustrated in 704. In edge-based connectivity, two voxels are identified as sharing a common edge, or a minimum of two nodes (denoted in a dashed line in 704). Point-based connectivity (option 26) is illustrated in 706. In point-based connectivity, two voxels are identified as sharing a common point, or a single node (denoted with an enlarged dot in 706).

The combination of Connected Components analysis with the results of an invasion simulation can be used to predict initial wetting phase saturation and residual non-wetting phase saturation. Invasion is a process by which a fluid enters a permeable rock. During an invasion process two or more immiscible fluids will reside within the pore space of a porous material. For a digital rock application, an invasion process will numerically simulate changes in the locations of the two immiscible fluids, and changes in the amount of those fluids within the pore space. The change in the amount of each fluid within the pore space is considered a saturation change.

Moving now to block 210 of FIG. 2, the results of the morphology operations of block 208 are applied to distribute multiple fluid phases (e.g., a wetting phase and a non-wetting phase) in the pore space of the digital rock. Entry of fluid into the pore space is generally termed "invasion." In the oil and gas industry an invasion process is typically classified as either a drainage process or imbibition process. Whether an invasion process is drainage or imbibition, is typically determined the macroscopic response of the system, and the tendency for the system to exhibit a water-wet character, or an oil-wet character. The classification of a response as a drainage or imbibition is, however, the response of the system to differences in contact angle between the invading fluid and the solid phase of the rock. The invading fluid will be the fluid that is increasing in saturation. The contact angle of the invading fluid is defined by the shape of the fluid-fluid interface adjacent to a solid. If the contact angle is less than 90° the invading fluid is considered to be the wetting fluid. If the contact angle is larger than 90° the invading fluid is considered to be the non-wetting fluid. In a drainage process the invading fluid is considered to be the non-wetting fluid. In an imbibition process the invading fluid is considered to be the wetting fluid.

In a drainage process, a wetting fluid in the pore space of the rock is displaced from the pore space by a non-wetting fluid. Examples of drainage processes that are relevant to the oil and gas industry include: migration of oil into a reservoir, invasion of a non-wetting drilling fluid from a bore hole into a reservoir formation during the drilling process, and injection of gas into a reservoir during the production. A drainage process may be performed using a combination of three operations: erosion, connected component analysis, and dilation. At the start of a drainage simulation, the pore space of a digital rock is saturated with a wetting fluid, such as water. A non-wetting fluid is connected to one or more sides (i.e., inlets) of the rock at zero capillary pressure. In the erosion operation, the capillary pressure is increased to trigger invasion of the pore space by the non-wetting fluid, and the radius of a sphere corresponding to the capillary pressure is determined according to the Young-Laplace equation. At a given capillary pressure, the loci of the centers of a spherical structural element R of radius r in the pore space are determined. Thereafter, in the connected component analysis, eroded pore space that is connected to an inlet is identified. Finally, dilation is applied to the pore space identified in the connected component analysis using a sphere of radius r identified in the erosion.

In a conventional drainage process, the erosion, connected component analysis, and dilation are iteratively performed at each applied capillary pressure. Embodiments of the system and method disclosed herein, apply an improved drainage process that reduces the time and computational resources needed to simulate a drainage process in a digital rock. By reducing the time and computational resources needed to simulate drainage, embodiments of the present disclosure allow petrophysical properties of a rock to be determined more quickly and at lower cost than with conventional simulation processes. The drainage process disclosed herein performs erosion and dilation in a single pass to substantially reduce the computational resources needed to simulate drainage.

FIG. 8 shows a flow diagram for a drainage process performed on a digital representation of a rock sample in accordance with principles disclosed herein. Though depicted sequentially as a matter of convenience, at least some of the actions shown can be performed in a different order and/or performed in parallel. Additionally, some embodiments may perform only some of the actions shown.

In some embodiments, at least some of the operations of the method 800, as well as other operations described herein, can be implemented as instructions stored in a computer readable medium and executed by one or more of the processors 902.

In block 802, the Euclidean Distance Transform is computed for each voxel of the digital rock pore space. The Euclidean Distance Transform labels each pore voxel with the value of the Euclidian distance to the nearest solid space voxel.

In block 804, a threshold is applied to the Euclidean Distance Transform values generated in block 802. All distance values greater than or equal to the threshold are retained. The threshold value may be varied to change the saturation of non-wetting fluid produced by the drainage. In the drainage process 800, applying a threshold of value r to the Euclidean Distance Transform produces results equivalent to conventional erosion of a pore space by a spherical structural element of radius r, but with much lower computational complexity.

In block 806, pore voxel to inlet connectivity is analyzed. Analysis of connectivity may include iteratively analyzing connection of the voxel locations corresponding to the Euclidean distance values retained in the thresholding of block 804. The result of the connectivity analysis at each iteration is added to a data set that tracks the evolution of the set of voxels connected to the inlet. The inlet can be any combination of the 6 sides of a digital rock though which the non-wetting fluid invades the digital rock.

In block 808, dilation is applied to the data set produced by the connectivity analysis of block 806. Dilation is applied to the elements of the set in the order that the elements were added to the set. That is, dilation starts at the inlet and proceeds into the pore space. Unlike conventional erosion, the dilation process of the method 800 is performed in a single pass rather than iteratively.

The drainage process of the method 800 provides improved computational performance by replacing the time consuming erosion step of conventional drainage processes with a threshold applied to a Euclidean Distance Transform. Use of the Euclidean Distance Transform improves the fidelity of the simulated capillary pressure curves. This is because for any given pore voxel, the value of the Euclidean Distance Transform at that voxel provides the value of the maximum sphere that is centered at that voxel. The number of discrete values in the Euclidean Distance Transform therefore defines a maximum number of different sphere sizes, and, subsequently, capillary pressures, that can be supported by the pore space of a given image. Because the drainage process of the method 800 automatically probes each value contained in the Euclidean Distance Transform, the method 800 ensures that the resolution of simulated capillary pressure curves for a digital rock application is optimized.

Figure 9:
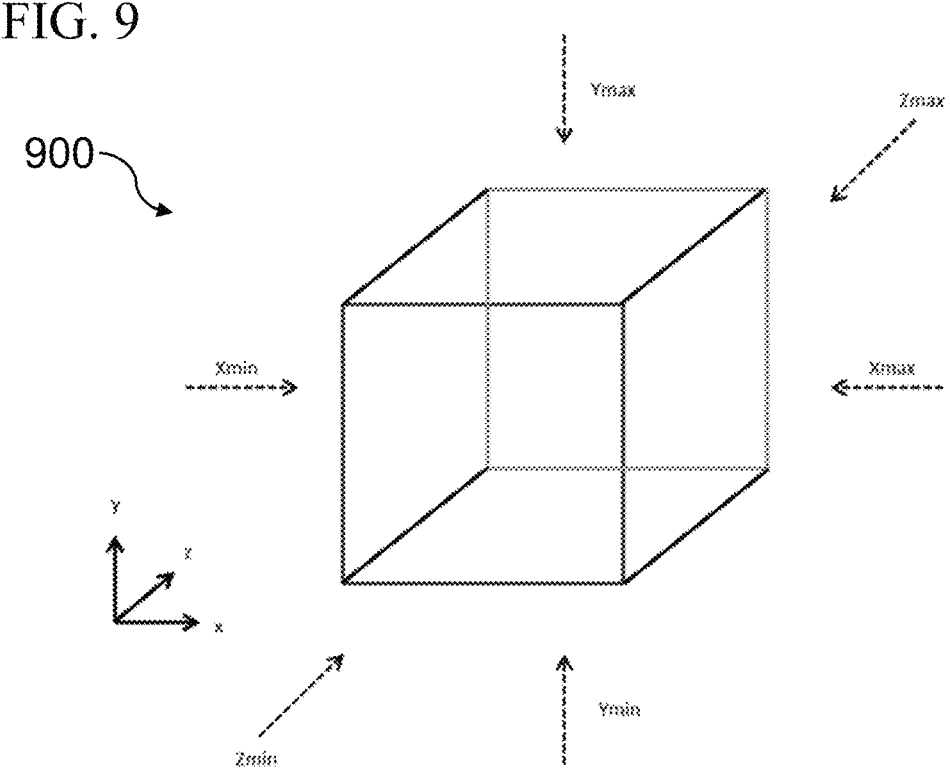
FIG. 9 shows application of a drainage process performed on a digital representation of a rock sample with fluid invasion from any one or more sides in accordance with principles disclosed herein.

FIG. 9 shows a schematic view of the six sides of a digital rock image 900. The digital rock image 900 may correspond to the image volume 128. The drainage simulation of the method 800 permits invasion of the non-wetting phase from an arbitrary combination of faces of the digital rock 900. In electrical conductivity simulations, current flow through the digital rock 900 is simulated. For example, a current could be induced through the digital rock 900 by applying a voltage drop in the z-direction. The voltage drop may be established by applying a higher voltage at an inlet plane, designated as Zmin, relative to an outlet plane, designated as Zmax. Performing drainage simulations with invasion from different sides of the digital rock 900 can create saturation profiles that are significantly different along the direction of current flow, and that in turn result in different electrical conductivities.

Drainage capillary pressure ($P_c$) based distributions use the results of drainage capillary pressure simulations to determine the distribution of two immiscible phases, one of which is preferentially wetting. Distribution patterns based on $P_c$ results require the non-wetting phase invading the domain to remain connected to an inlet. Flexibility designed in a drainage simulator using the method 800 allows for the non-wetting phase to invade the pore space from an arbitrary combination of the 6-sides.

Figure 10A:
FIG. 10A shows fluid distribution in a digital rock based on a drainage simulation with invasion from one side in accordance with principles disclosed herein
Figure 10B:
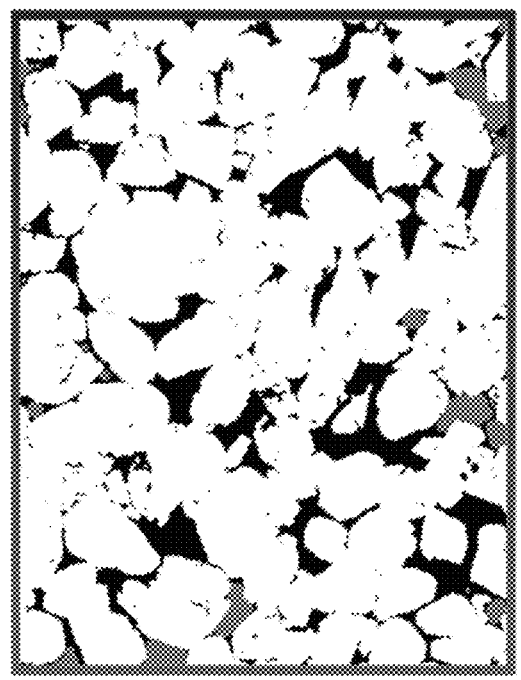
FIG. 10B shows fluid distribution in a digital rock based on a drainage simulation with invasion from six sides in accordance with principles disclosed herein.

FIGS. 10A and 10B shows 2D slices through a 3D image of a sandstone volume, and two fluid distribution patterns based on discrete drainage simulations using the method 800. The saturation distribution is at a same capillary pressure in both images. FIG. 10A shows 1-sided invasion from the Zmin face (see FIG. 9), and FIG. 10B shows a 6-sided invasion. In FIGS. 10A and 10B, white denotes the solid space, black denotes the pore space occupied by a wetting fluid, and gray denotes the pore space occupied by a non-wetting fluid.

Based on results of a drainage simulation, the computing device 120 may assign a wettability distribution to the digital rock. The wettability distribution sets, for each solid space voxel adjacent a pore space voxel or each solid space voxel, a fluid contact angle value. In oil-water reservoir systems, the reservoirs may be referred to as being water-wet, mixed-wet, or oil wet. Determining whether or not a given surface is water or oil wet is typically based on the contact angle the oil-water interface makes with the solid surface. In the case of a water-wet system, the contact angle will be a value less than 90° (water spread across surface). For an oil-wet system the water will tend to sit on the surface so that the contact angle is greater than 90°. The contact angle assigned to a voxel may be based on the results of the drainage process 800. For example, on completion of a drainage simulation in accordance with the method 800, the fluid in contact with each solid space voxel may be determined. If the fluid is a wetting fluid, then a contact angle less than 90° may be assigned to the voxel. If the fluid is a non-wetting fluid, then a contact angle greater than 90° may be assigned to the voxel. In some embodiments, the contact angle may also be assigned based on a determined material of each grain of the solid space, where, for example, grain material types are distinguished during segmentation. It is often assumed that rock surface is rendered oil wet due to the deposition of organic content found in oil, while surface in contact with water remains water wet. As oil migration into a reservoir is assumed to be a drainage process, establishing good oil-water phase distributions provides a physical approach for distributing wettability in a digital rock.

Imbibition is another invasion process that may be simulated in block 210 of FIG. 2. During an imbibition process, a non-wetting fluid is displaced from the pore space of a digital rock by a wetting fluid. The simulation of an imbibition process is readily adapted from the framework employed to simulate drainage. Unlike a drainage simulation where the invading phase will preferentially occupy the larger pores, during an imbibition process the invading phase will preferentially occupy the near wall regions, and smaller pores of a digital rock. Examples of imbibition processes that are relevant to the oil and gas industry are: scenarios where water from an aquifer below a reservoir may enter the hydrocarbon bearing region of a reservoir; water injection into a water wet reservoir; water injection in a region near the contact between a hydrocarbon zone, and an aquifer below a reservoir; and invasion of a drilling fluid into a reservoir during the drilling process.

Returning now to block 212 of FIG. 2, given the fluid saturation produced by application of the drainage and/or imbibition processes disclosed herein, the computing device 120 numerically analyzes the digital image volume 128 to determine physical properties of the rock 104. In the context of oil and gas exploration and production, a variety of petrophysical properties may be of interest, and such properties can be estimated using the digital image volume 128 and an appropriate direct numerical simulation. The properties simulated may include effective gas permeability, quasi-static relative permeability, nuclear magnetic resonance, and resistivity index.

Effective gas permeability computation uses the results of drainage simulations (and approaches to distribute two fluids in the pore phase of a digital rock image to create a discrete saturation state (a unique gas saturation $S_g$). Each saturation state is then used as input to a single phase flow direct numerical simulation. The effective gas permeability at a given gas saturation is defined as:

$$k_{g,\mathit{eff}}(S_g) = \frac{k_g(S_g)}{k_{abs}}$$

where:
$k_{abs}$ denotes the absolute permeability of the rock (a measure of how readily fluid will flow through the rock);
$k_g(S_g)$ is the permeability of the rock to gas at a given gas saturation; and
$k_g$, eff is the ratio of the two values.

By performing direct numerical simulations at a number of gas saturations, the effective gas permeability of a digital rock is predicted as a function of water saturation. Examples of effective gas permeability application include: evaluation the rate of gas production as a function of water saturation; and identification of critical water saturation, i.e., the water saturation where negligible (non-profitable) gas is produced. Effective gas permeability may be determined based on the output of drainage simulations, or any other approach that distributes two fluids in the pore space of a digital rock. For example, effective gas permeability may be determined based on a capillary drainage approach or a maximum inscribed spheres approach as described herein.

Figure 11:
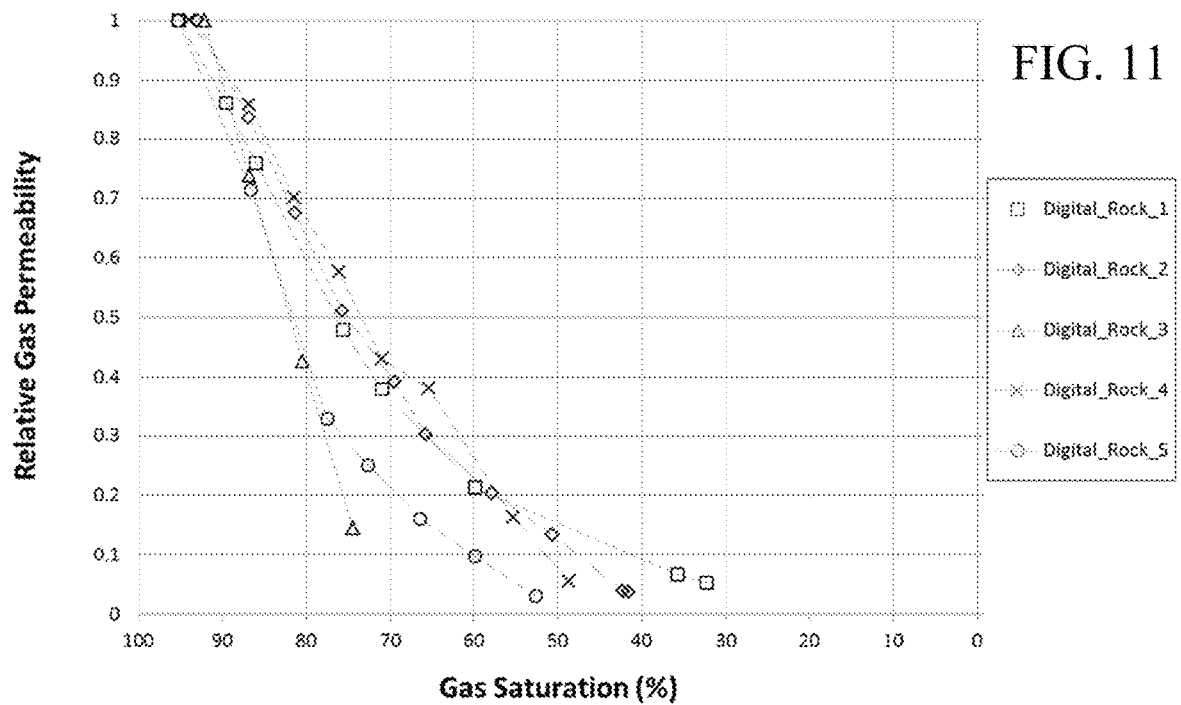
FIG. 11 shows a graph of effective gas permeability determined for a digital rock in accordance with principles disclosed herein.

FIG. 11 shows results of effective gas permeability computation. In FIG. 11 the relative gas permeability data shows the response to saturation patterns based on drainage simulations for several input images. In the case of a reservoir producing gas, it is desirable to understand how the effective permeability to gas changes as a function of saturation. The figure highlights how different rocks could stop flowing gas at gas saturations between ~70-25%.

Relative permeability of a specific fluid is the ratio of the effective permeability of that fluid at a given saturation, to some base (absolute) value of permeability. The relative permeability of a given rock is typically determined experimentally by a steady-state method, or an unsteady-state method. In both the steady-state and unsteady-state methods, a fluid, or fluids, is introduced into the pore space of a rock at some initial saturation condition. Quasi-static relative permeability may be computed as:

$$k_{r(o,w)}(S_{(o,w)}) = \frac{k_{(o,w)}(S_{(o,w)})}{k_{abs}}$$

where:
$k_{abs}$ denotes the absolute permeability of the rock as described above;
$k_{(o,w)}S_{(o,w)}$ is the permeability to oil or water at a given oil/water saturation; and
$k_r$, the relative permeability, is the ratio of the permeability of either oil or water to the absolute permeability of the rock.

By performing single phase direct numerical simulations on the oil and water separately, embodiments can determine the relative permeability of each, at a given saturation. Relative permeability may be applied, for example, to evaluate the rate of oil and water production as a function of saturation, or to identify initial production rates (effective oil permeability at initial water saturation).

Figure 12:
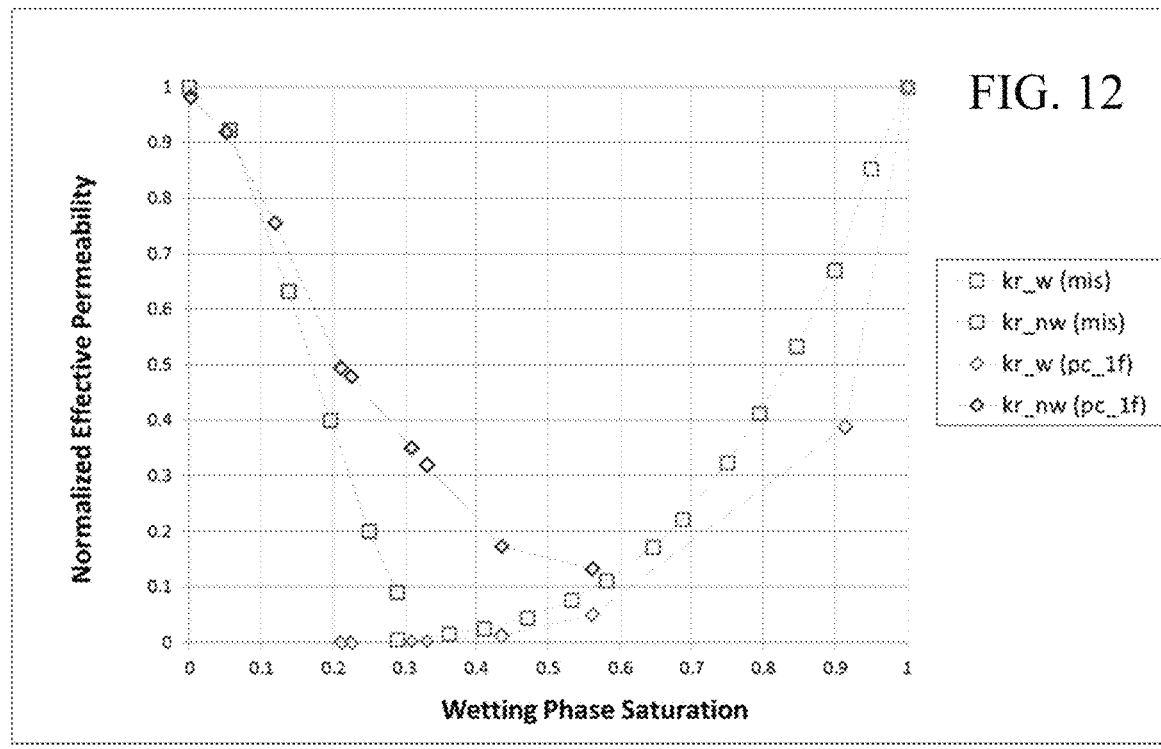
FIG. 12 shows a graph of data produced by a quasi-static relative permeability method in accordance with principles disclosed herein.

FIG. 12 shows results of quasi-static relative permeability computation based on drainage simulations (pc_1f) and maximum inscribed spheres (mis) used to locate the wetting and non-wetting phases within a digital rock. By assuming there is no transfer of momentum at the fluid-fluid (oil-water) interface the saturation patterns can be used in a single-phase flow simulator. In this case a fluid-fluid interface is treated with the same boundary condition as a fluid-solid interface, a no-slip (zero velocity) boundary condition. By separately using wetting and non-wetting phase distributions in a single-phase flow simulator, embodiments can generate the quasi-static relative permeability curves. The quasi-static permeability computation can be considered an approximate or screening relative permeability simulator. While direct numerical simulation techniques are available for simulation of two-phase flow, such techniques are very expensive computationally in comparison to the quasi-static approach disclosed herein.

Figure 13:
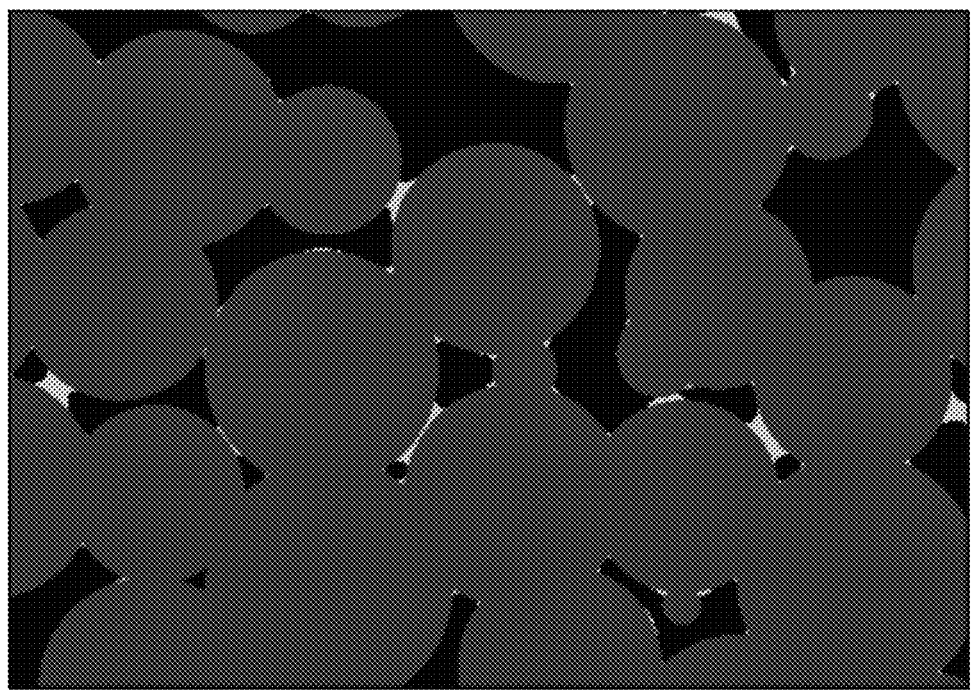
FIG. 13 shows an example of a water distribution produced by a drainage simulation that prevents invasion of regions where water is isolated.

The system 102 provides the flexibility to begin multi-phase flow simulations from different initial saturations. Such flexibility is important because any given reservoir will exhibit a range of saturation states over the producing life of a field. During relative permeability simulations, an initial saturation is typically established by a drainage process where a non-wetting phase displaces the water phase initially occupying the pore space. Once the initial saturation is established, a simulation to determine the relative permeability will typically proceed following an unsteady-state, or steady-state, procedure. FIG. 13 shows a digital rock having an initial water distribution set by a drainage simulation. During the simulation, embodiments of the method 800 may add criteria to prevent the invasion of regions of the pore space where water becomes isolated, or disconnected from the outlet of the digital rock. These regions are identified by the light regions of FIG. 13, and tend to reside near the grain-grain contacts, and in the smaller regions of the pore space. This process can be taken to represent a laboratory procedure where an initial water saturation, sometimes referred to as the irreducible or connate water saturation, is established.

The resistivity index (RI) of a rock is the ratio of the true resistivity of the rock (e.g., at a given saturation) to the resistivity of the same rock filled with water. Thus, RI may be defined as:

$$RI = \frac{R_t}{R_o}$$

where:
$R_t$ denotes the resistivity at a given saturation; and
$R_O$ denotes the resistivity at 100% water saturation.

The best fit of the RI data plot against water saturation using a power law fit gives the saturation exponent (n) for a given sample where:

$$RI = S_W^{-n}.$$

The saturation exponent n is combined with log derived estimates of formation water resistivity ($R_w$), true resistivity ($R_t$) and porosity ($\phi$) to estimate the water saturation of a reservoir, a key function of formation evaluation by the following equation:

$$S_w = \sqrt[n]{\frac{R_w}{\phi^m R_t}}$$

Resistivity Index is simulated by providing a Digital Rock saturated with two or more immiscible fluids as input to an electrical conductivity simulator. The system 102 may include any of a number of different electrical conductivity simulators that can be used based on different numerical approaches. Two common electrical conductivity simulators utilize finite difference or finite element approaches to solve for electrical current. The system 102 may simulate Resistivity Index by providing a digital rock saturated with two or more immiscible fluids as input to an electrical conductivity simulator. The oil (or gas) and solid phase may be effectively treated as non-conductive, relative to a brine or microporous phase that are treated as conductive.

The distribution of fluids in the pore space has a significant impact on the Resistivity Index, and in turn on the saturation exponent (n). Embodiments of the system 102 provide flexibility in saturating a digital rock, which is important because understanding which distribution is characteristic of a particular reservoir is important to formation evaluation. Determining appropriate values of the saturation exponent are particularly useful as resistivity logging often uses the saturation exponent to convert the data acquired by electrical logging tools to water saturations. Understanding the location and amount of water in a hydrocarbon bearing rock formation is important to optimizing the development of a given reservoir.

The above discussion is meant to be illustrative of various principles and embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A method for analyzing a rock sample, comprising:
   segmenting a digital image volume corresponding to one or more images of the rock sample, to associate voxels in the digital image volume with pore space or solid material;
   for each pore space voxel: applying a Euclidean distance transform to the pore space voxel, wherein the Euclidean distance transform determines a Euclidean distance from the pore space voxel to a solid material voxel nearest to the pore space voxel and assigns the Euclidean distance to the pore space voxel;
   numerically simulating drainage of the rock sample by:
   for each pore space in the digital image volume:

comparing each Euclidean distance, assigned to the pore space voxel of the pore space, to a predetermined threshold value, wherein the predetermined threshold value is varied to correspond to a change in a saturation of a non-wetting fluid produced by the simulated drainage and introduced into the pore space; and selecting the Euclidean distance, assigned to the pore space voxel of the pore space, that is greater than or equal to the predetermined threshold value to represent a maximum radius of a sphere of the non-wetting fluid, and wherein the sphere is centered at the pore space voxel corresponding to the Euclidean distance, wherein the Euclidean distance assigned to the pore space voxel of the each pore space defines a maximum number of different sphere sizes that is supported by the each pore space of the digital image volume; and numerically analyzing the digital image volume to characterize a material property of the rock sample at the saturation of the non-wetting fluid.

2. The method of claim 1, wherein simulating drainage of the rock sample comprises:

after completing application of the Euclidean distances to represent spheres of non-wetting fluid in the digital image volume, iteratively, analyzing connectivity of each pore space to an inlet through which the non-wetting fluid is introduced to the digital image volume.

3. The method of claim 2, wherein simulating drainage of the rock sample comprises:

after completion of the iteratively analyzing connectivity, instantiating each sphere of non-wetting fluid identified as having connectivity to the inlet in an order of connectivity identified in the iteratively analyzing connectivity.

4. The method of claim 2, wherein the inlet comprises any side of the digital image volume, or the inlet comprises any plurality of sides of the digital image volume.

5. The method of claim 1, wherein simulating drainage of the rock sample comprises inhibiting introduction of non-wetting fluid into areas of the pore space that lack a connection to an outlet through which wetting fluid exits the digital image volume.

6. The method of claim 1, further comprising varying the predetermined threshold value to change the non-wetting fluid saturation.

7. The method of claim 1, wherein each sphere of the non-wetting fluid is completely contained within a pore space based on the Euclidean distance derived from the Euclidean distance transform.

8. The method of claim 1, wherein the numerically analyzing comprises:

determining a value of effective gas permeability for the rock sample by applying a single phase flow simulation to a wetting fluid and the non-wetting fluid in the pore space;

determining a value of quasi-static relative permeability for the wetting fluid and the non-wetting fluid in the pore space by applying a single phase flow simulation;

determining a resistivity index for the rock sample by assigning conductive properties to distinct material and fluid phases, wetting and non-wetting, and applying an electrical conductivity simulation to the digital image volume, as saturated by the drainage; or determining a nuclear magnetic response by applying a nuclear magnetic resonance simulation to the digital image volume, as saturated by the drainage process, to the wetting and the non-wetting fluid in the pore space.

9. The method of claim 1, further comprising assigning, based on the fluid saturation produced by the drainage, a fluid contact angle to each solid material voxel that is adjacent a pore space voxel.

10. A system for analyzing a rock sample, comprising:
an imaging device configured to produce a digital image volume representative of the rock sample; and
a computing device coupled to the imaging device and comprising:
one or more processors; and
one or more storage devices, coupled to the one or more processors, and configured to store instructions that, when executed by the one or more processors, configure the one or more processors to:
segment a digital image volume corresponding to one or more images of the rock sample, to associate voxels in the digital image volume with pore space or solid material;
for each pore space voxel:
apply a Euclidean distance transform to the pore space voxel, wherein the Euclidean distance transform determines a Euclidean distance from the pore space voxel to a solid material voxel nearest to the pore space voxel and assigns the Euclidean distance to the pore space voxel;
perform a direct numerical simulation of drainage of the rock sample, and as part of the simulation to:
for each pore space in the digital image volume:
compare each Euclidean distance, assigned to the pore space voxel of the pore space, to a predetermined threshold value, wherein the predetermined threshold value is varied to correspond to a change in a saturation of a non-wetting fluid produced by the simulated drainage and introduced into the pore space; and
select the Euclidean distance, assigned to the pore space voxel, that is greater than or equal to the predetermined threshold value to represent a maximum radius of a sphere of the non-wetting fluid, and wherein the sphere is centered at the pore space voxel corresponding to the Euclidean distance,
wherein the Euclidean distance assigned to the pore space voxel of the each pore space defines a maximum number of different sphere sizes that is supported by the each pore space of the digital image volume; and
numerically analyze the digital image volume to characterize a material property of the rock sample at the saturation of the non-wetting fluid.

11. The system of claim 10, wherein the instructions configure the one or more processors to, as part of the simulation:

after completion of application of the Euclidean distances to represent spheres of non-wetting fluid in the digital image volume, iteratively analyze connectivity of each pore space to an inlet through which the non-wetting fluid is introduced to the digital image volume; and thereafter instantiate each sphere of non-wetting fluid identified as having connectivity to the inlet in the order of connectivity identified in the iterative analysis.

12. The system of claim 11, wherein the inlet comprises any side of the digital image volume, or the inlet comprises any plurality of sides of the digital image volume.

13. The system of claim 10, wherein the instructions configure the one or more processors to, as part of the simulation, inhibit introduction of non-wetting fluid into areas of the pore space that lack a connection to an outlet through which wetting fluid exits the digital image volume.

14. The system of claim 10, wherein the instructions configure the one or more processors to, as part of the simulation, vary the predetermined threshold value to change the non-wetting fluid saturation.

15. The system of claim 10, wherein the instructions configure the one or more processors to, as part of the simulation:
generate each sphere of the non-wetting fluid completely within a pore space based on the Euclidean distance derived from the Euclidean distance transform.

16. The system of claim 10, wherein the instructions configure the one or more processors to:
determine a value of effective gas permeability for the rock sample by applying a single phase flow simulation to a wetting fluid and the non-wetting fluid in the pore space;
determine a value of quasi-static relative permeability for the wetting fluid and the non-wetting fluid in the pore space by: applying a single phase flow;
determine a resistivity index for the rock sample by assigning conductive properties to distinct material and fluid phases, wetting and non-wetting, and applying an electrical conductivity simulation to the digital image volume, as saturated by the drainage; or
determine a nuclear magnetic response by applying a nuclear magnetic resonance simulation to the digital image volume, as saturated by the drainage process, to the wetting and the non-wetting fluid in the pore space.

17. The system of claim 10, wherein the instructions configure the one or more processors to assign, based on the fluid saturation produced by the drainage, a fluid contact angle to each solid material voxel that is adjacent a pore space voxel.

18. A non-transitory computer readable medium encoded with instructions that when executed cause one or more processors to:
segment a digital image volume corresponding to one or more images of the rock sample, to associate voxels in the digital image volume with pore space or solid material;
for each pore space voxel:
apply a Euclidean distance transform to the pore space voxel, wherein the Euclidean distance transform determines a Euclidean distance from the pore space voxel to a solid material voxel nearest to the pore space voxel and assigns the Euclidean distance to the pore space voxel;
perform a direct numerical simulation of drainage of the rock sample, and as part of the simulation to:
for each pore space in the digital image volume:
compare each Euclidean distance, assigned to the pore space voxel of the pore space, to a predetermined threshold value, wherein the predetermined threshold value is varied to correspond to a change in a saturation of a non-wetting fluid produced by the simulated drainage and introduced into the pore space; and
select the Euclidean distance, assigned to the pore space voxel, that is greater than or equal to the predetermined threshold value to represent a maximum radius of a sphere of the non-wetting fluid, and wherein the sphere is centered at the pore space voxel corresponding to the Euclidean distance,
wherein the Euclidean distance assigned to the pore space voxel of the each pore space defines a maximum number of different sphere sizes that is supported by the each pore space of the digital image volume; and
numerically analyze the digital image volume to characterize a material property of the rock sample at the saturation of the non-wetting fluid.

19. The computer readable medium of claim 18, wherein the instructions cause the one or more processors to, as part of the simulation:
after completion of application of the Euclidean distances to represent spheres of non-wetting fluid in the digital image volume, iteratively analyze connectivity of each pore space to an inlet through which the non-wetting fluid is introduced to the digital image volume; and thereafter
instantiate each sphere of non-wetting fluid identified as having connectivity to the inlet in the order of connectivity identified in the iterative analysis;
wherein the inlet comprises any one or more sides of the digital image volume.

20. The computer readable medium of claim 18, wherein the instructions cause the one or more processors to, as part of the simulation, inhibit introduction of non-wetting fluid into areas of the pore space that lack a connection to an outlet through which wetting fluid exits the digital image volume.

21. The computer readable medium of claim 18, wherein the instructions cause the one or more processors to change the non-wetting fluid saturation by varying the predetermined threshold.

22. The computer readable medium of claim 18, wherein the instructions cause the one or more processors to:
determine a value of effective gas permeability for the rock sample by applying a single phase flow simulation to a wetting fluid and the non-wetting fluid in the pore space;
determine a value of quasi-static relative permeability for the wetting fluid and the non-wetting fluid in the pore space by: applying a single phase flow;
determine a resistivity index for the rock sample by assigning conductive properties to distinct material and fluid phases, wetting and non-wetting, and applying an electrical conductivity simulation to the digital image volume, as saturated by the drainage; or
determine a nuclear magnetic response by applying a nuclear magnetic resonance simulation to the digital image volume, as saturated by the drainage process, to the wetting and the non-wetting fluid in the pore space.

23. The computer readable medium of claim 18, wherein the instructions cause the one or more processors to assign, based on the fluid saturation produced by the drainage, a fluid contact angle to each solid material voxel that is adjacent a pore space voxel.

* * * * *